US012407212B2

(12) United States Patent
Nakano (10) Patent No.: US 12,407,212 B2
(45) Date of Patent: Sep. 2, 2025

(54) MOTOR WITH A MOTOR TERMINAL (71) Applicant: MINEBEA MITSUMI Inc., Nagano (JP)

(72) Inventor: Tomoaki Nakano, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 558 days.

(21) Appl. No.: 17/756,862

(22) PCT Filed: Dec. 10, 2020

(86) PCT No.: PCT/JP2020/045978
§ 371 (c)(1),
(2) Date: Jun. 3, 2022

(87) PCT Pub. No.: WO2021/125025
PCT Pub. Date: Jun. 24, 2021

(65) Prior Publication Data
US 2023/0015913 A1    Jan. 19, 2023

(30) Foreign Application Priority Data

Dec. 16, 2019    (JP) .................................. 2019-226725

(51) Int. Cl.
*H02K 5/22* (2006.01)
(52) U.S. Cl.
CPC .................... *H02K 5/225* (2013.01)
(58) Field of Classification Search
CPC .......... H02K 5/22; H02K 5/225; H02K 11/30; H02K 11/33; H02K 2203/09; H02K 2203/06; H02K 5/15
See application file for complete search history.

(56) References Cited

U.S. PATENT DOCUMENTS

| 2014/0265749 | A1* | 9/2014 | Motoda | H02K 11/30 310/68 R |
| 2015/0171709 | A1* | 6/2015 | Ito | H02K 5/225 310/52 |
| 2016/0036306 | A1* | 2/2016 | Yamasaki | H02K 5/225 310/71 |
| 2017/0373451 | A1 | 12/2017 | Asada et al. | |

FOREIGN PATENT DOCUMENTS

| EP | 0 655 822 A1 | 5/1995 | |
| EP | 2371673 A2 * | 10/2011 | ........... B62D 5/0406 |
| EP | 3 678 284 A1 | 7/2020 | |
| JP | H07-194052 A | 7/1995 | |

(Continued)

OTHER PUBLICATIONS

Tominaga, jp2009248864 drawings from epo global dossier, Oct. 2009 (Year: 2009).*

(Continued)

*Primary Examiner* — Eric Johnson
(74) *Attorney, Agent, or Firm* — Chrisman Gall Tochtrop LLC (57) ABSTRACT

A motor according to an embodiment includes a cap and a housing. The housing is provided with the cap. The cap is provided with a first terminal. The housing is provided with a second terminal. The first terminal and the second terminal engage with each other to form a terminal portion.

4 Claims, 7 Drawing Sheets

(56) References Cited

FOREIGN PATENT DOCUMENTS

| | | | |
|---|---|---|---|
| JP | 2009-254127 A | | 10/2009 |
| JP | 2009248864 A | * | 10/2009 |
| JP | 2013196973 A | * | 9/2013 |
| JP | 2016-149216 A | | 8/2016 |
| JP | 2018-071499 A | | 5/2018 |
| JP | 2019-041549 A | | 3/2019 |

OTHER PUBLICATIONS

Tominaga et al., Machine Translation of JP2009248864, Oct. 2009 (Year: 2009).*
Motoda, Machine Translation of JP2013196973, Sep. 2013 (Year: 2013).*
International Search Report for corresponding International Application No. PCT/JP2020/045978 mailed Feb. 2, 2021.
Written Opinion for corresponding International Application No. PCT/JP2020/045978 dated Feb. 2, 2021.
English translation of the Written Opinion for corresponding International Application No. PCT/JP2020/045978 dated Feb. 2, 2021.

* cited by examiner

MOTOR WITH A MOTOR TERMINAL

CROSS-REFERENCE TO RELATED APPLICATIONS

This application is a national stage entry of International Application No. PCT/JP2020/045978 filed on Dec. 10, 2020, which claims the benefit of priority to Japanese Application No. JP2019-226725, filed Dec. 16, 2019, the entire disclosures of which are hereby incorporated herein by reference.

TECHNICAL FIELD

The present invention relates to a motor.

BACKGROUND ART

A motor such as a brushless motor is provided with a motor terminal for external power supply. The motor terminal is provided on a cap or the like of the motor, and a lead wire forming a coil of the motor is connected to the inner side of the motor terminal by fusing or entwining. The outer side of the motor terminal is an electrode such as a plug blade inserted into a power supply connector or the like (for example, see Patent Document 1).

CITATION LIST

Patent Literature

Patent Document 1: JP 2019-41549 A

SUMMARY OF INVENTION

Technical Problem

However, even with a motor having the same specifications for basic performance as a motor, the shape of the motor terminal may change according to the product to use the motor and requests from a delivery destination. In this case, the manufacturer or the like of the motor needs to change the motor terminal to a motor terminal having a required shape, and needs to newly design and manufacture a motor terminal having a changed shape or process the shape of a manufactured motor terminal, and this has been difficult.

Thus, in designing a motor terminal, the motor terminal needs to have a requested shape while exhibiting required performance, and the degree of freedom in design is limited.

In light of the foregoing, the present invention is directed at providing a motor capable of improving a degree of freedom in design of a motor terminal.

Solution to Problem

In order to solve the problem described above and achieve the object, a motor according to an aspect of the present invention includes a cap, and a housing. The housing is provided with the cap. The cap is provided with a first terminal. The housing is provided with a second terminal. The first terminal and the second terminal engage with each other to form a terminal portion.

A motor according to an aspect of the present invention can improve a degree of freedom in design of a motor terminal.

DESCRIPTION OF EMBODIMENTS

A motor according to an embodiment will be described below with reference to the drawings. Note that the present invention is not limited to the embodiment described above. Further, the dimensional relationships, proportions, and the like between elements in the drawings may differ from reality. Among the drawings, portions having mutually different dimensional relationships and proportions may be included. Furthermore, the contents described in one embodiment or modified example are applied in principle to other embodiments or modified examples.

Figure 1:
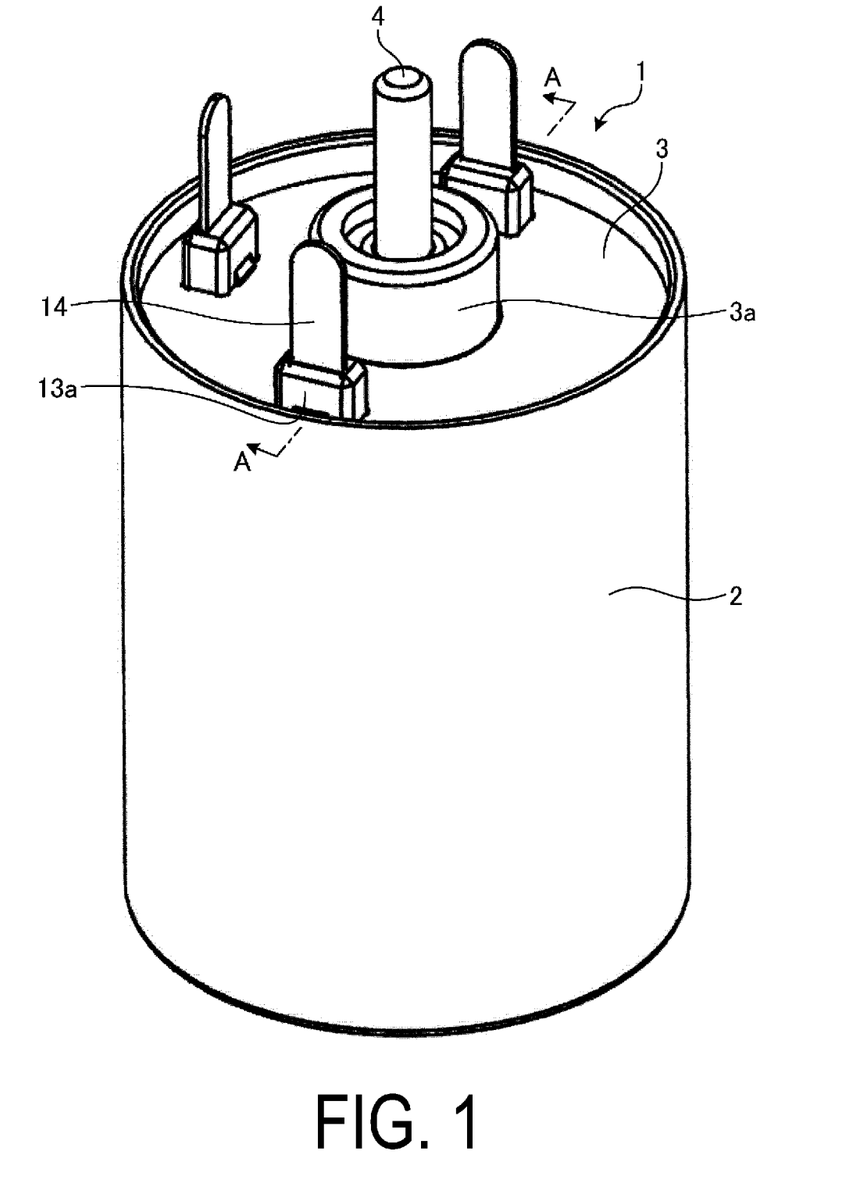
FIG. 1 is an external perspective view of a motor according to an embodiment.

FIG. 1 is an external perspective view of a motor 1 according to an embodiment. In FIG. 1, the motor 1 includes a housing 2 having a substantially cylindrical shape and a cap 3 covering an end portion of the housing 2 at an opening side. The housing 2 and the cap 3 are formed of a metal material, for example. A shaft 4 is exposed from a protruding portion 3a at a center of the cap 3. Furthermore, a boss portion 13a formed of an insulating material such as a resin protrudes from the cap 3, and an external terminal 14 formed of a metal material is exposed from the boss portion 13a.

Figure 2:
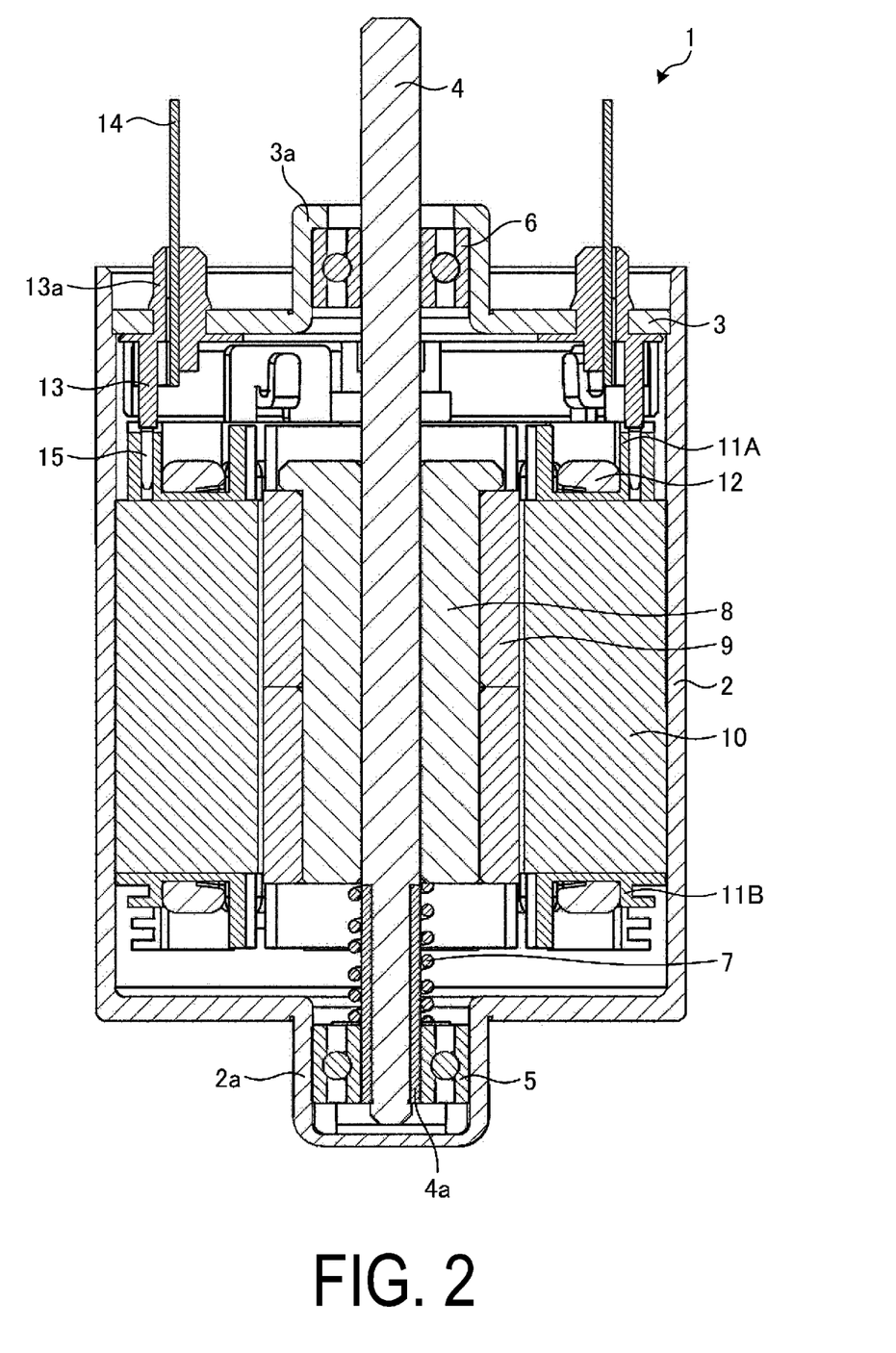
FIG. 2 is a cross-sectional view of the motor taken along line A-A in FIG. 1.

FIG. 2 is a cross-sectional view of the motor 1 taken along line A-A in FIG. 1. In FIG. 2, a bearing 5 is provided inside a protruding portion 2a at a center of the housing 2 at a side opposite to the cap 3 side (at a lower side in FIG. 2), a bearing 6 is provided inside the protruding portion 3a of the cap 3, and the shaft 4 is rotatably supported by the bearings 5 and 6. Furthermore, the shaft 4 is pressed from the bearing 5 side to the bearing 6 side by a spring 7. Note that a sleeve 4a is provided at an outer peripheral surface of the shaft 4 at the bearing 5 side.

A rotor yoke 8 having a substantially cylindrical shape is fixed to the outer peripheral surface of the shaft 4 in the vicinity of substantially the center of the shaft 4, and a magnet 9 having a substantially cylindrical shape is fixed to an outer peripheral surface of the rotor yoke 8. The shaft 4, the rotor yoke 8, and the magnet 9 form a rotor.

A stator core 10 including a core back and teeth is fixed to an inner peripheral surface of the housing 2, and a stator coil 12 is wound around the teeth of the stator core 10 via insulators 11A and 11B. The stator core 10, the insulators 11A and 11B, and the stator coil 12 form a stator.

Meanwhile, a terminal holder 13 is provided inside the cap 3, the boss portion 13a being a part of the terminal holder 13 protrudes outward from the cap 3, and the external terminal 14 is inserted into the boss portion 13a. Furthermore, a connection terminal 15 is disposed in the insulator 11A, and when the motor 1 is assembled, the external terminal 14 at the cap 3 side and the connection terminal 15 at the insulator 11A side engage with each other to be electrically connected.

The external terminal 14 is connected to the outside of the motor 1, and an end portion of a lead wire forming the stator coil 12 is welded to or entwined with and connected to the connection terminal 15. The external terminal 14 is an example of a first terminal. The connection terminal 15 is an example of a second terminal. The external terminal 14 and the connection terminal 15 engage with each other to form a terminal portion as an example.

Figure 3:
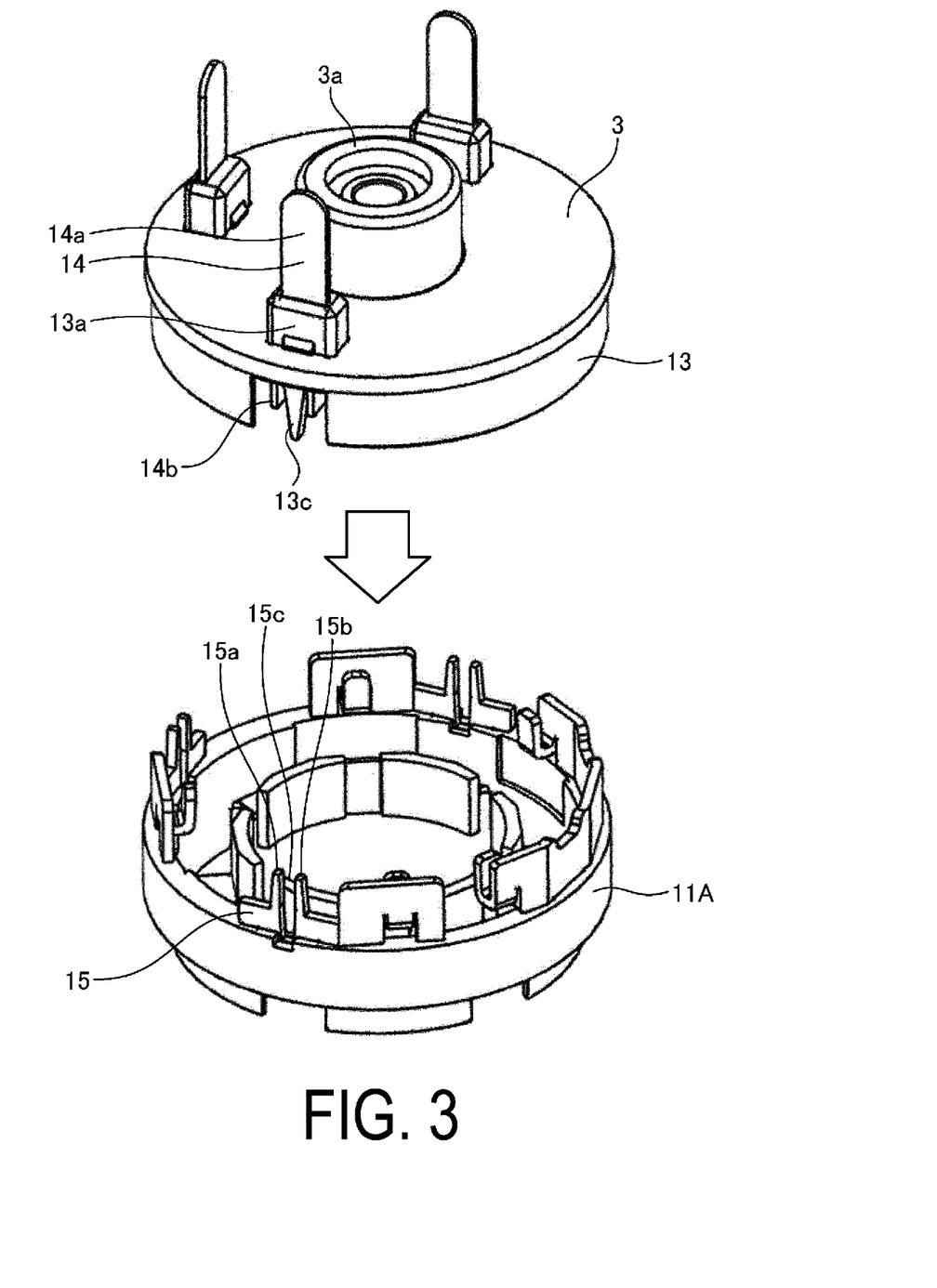
FIG. 3 is a partial exploded view illustrating a structure for engagement between an external terminal and a connection terminal.

FIG. 3 is a partial exploded view illustrating a structure for engagement between the external terminal 14 and the connection terminal 15. Note that FIG. 3 illustrates a state where a first member obtained by integrally assembling the cap 3, the terminal holder 13, and the external terminal 14, and a second member obtained by integrally assembling the insulator 11A, the connection terminal 15, and a coupling terminal 16 can be separated, and does not illustrate the other members.

Figure 4:
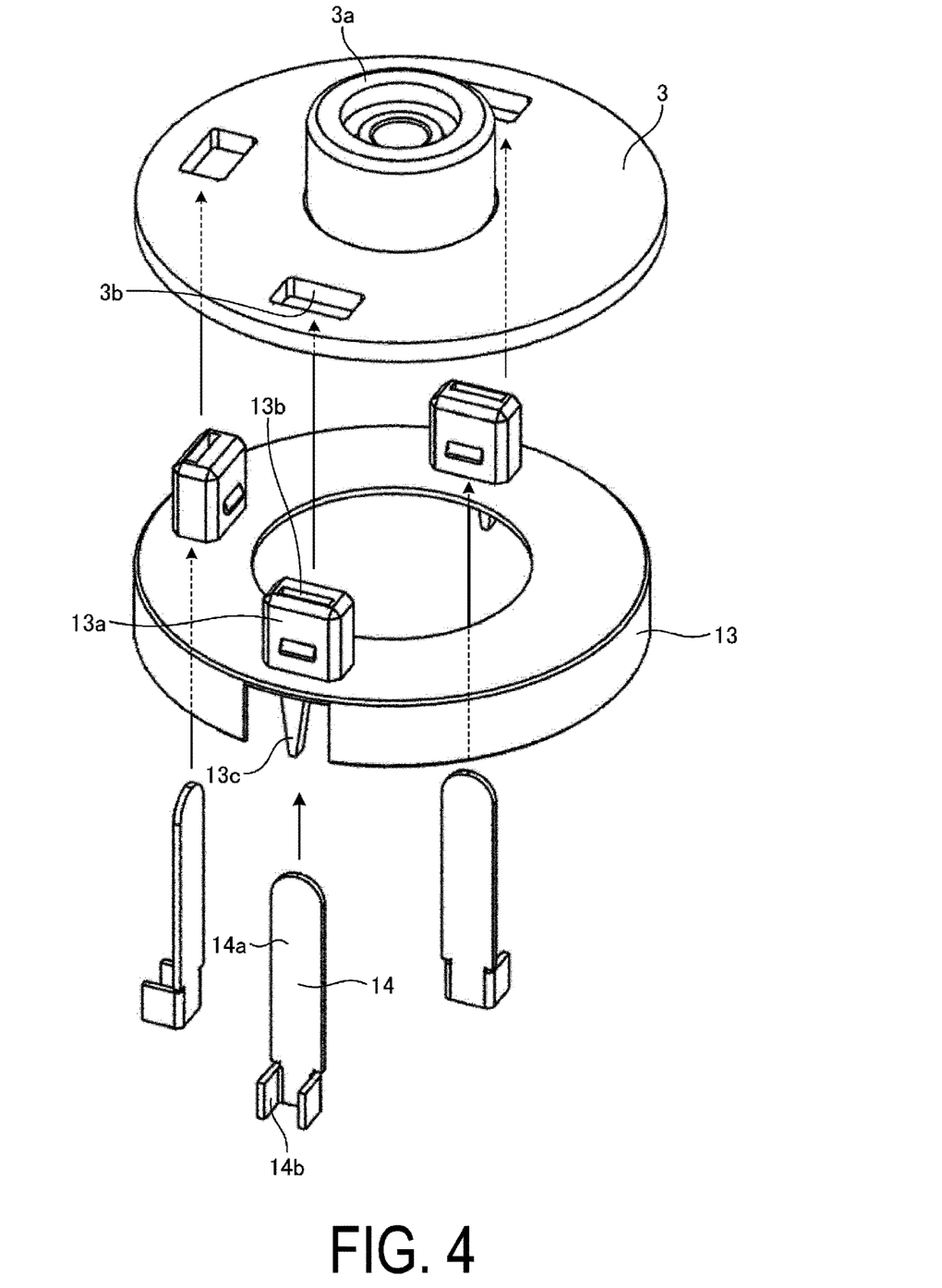
FIG. 4 is an exploded view illustrating details of a cap, a terminal holder, and the external terminal.

FIG. 4 is an exploded view illustrating details of the cap 3, the terminal holder 13, and the external terminal 14, and is an exploded view of the first member obtained by integrally assembling the cap 3, the terminal holder 13, and the external terminal 14 in FIG. 3.

In FIG. 4, the cap 3 is provided with the protruding portion 3a at the center, and a plurality of (three in the illustrated example) hole portions 3b are provided in a disk-shaped flat portion of the cap 3 having a substantially disk shape. Furthermore, the plurality of (three in the illustrated example) boss portions 13a protrude from a bottom portion of the terminal holder 13 having the shape of an inverted dish in the drawing. A hole portion 13b is formed in the boss portion 13a. A plug blade portion 14a of the external terminal 14 is inserted into the hole portion 13b. An engaged portion 14b having a shape with two bent wings is provided at a side opposite to the plug blade portion 14a of the external terminal 14. Furthermore, a protrusion part 13c extending between the engaged portions 14b of the external terminal 14 from a base portion of the boss portion 13a is provided at a side opposite to a direction in which the boss portion 13a of the terminal holder 13 protrudes.

Then, the plug blade portion 14a of the external terminal 14 is inserted into the hole portion 13b of the boss portion 13a of the terminal holder 13, and the boss portion 13a of the terminal holder 13 is inserted into the hole portion 3b of the cap 3 to form the first member as illustrated at the upper side in FIG. 3.

Figure 5:
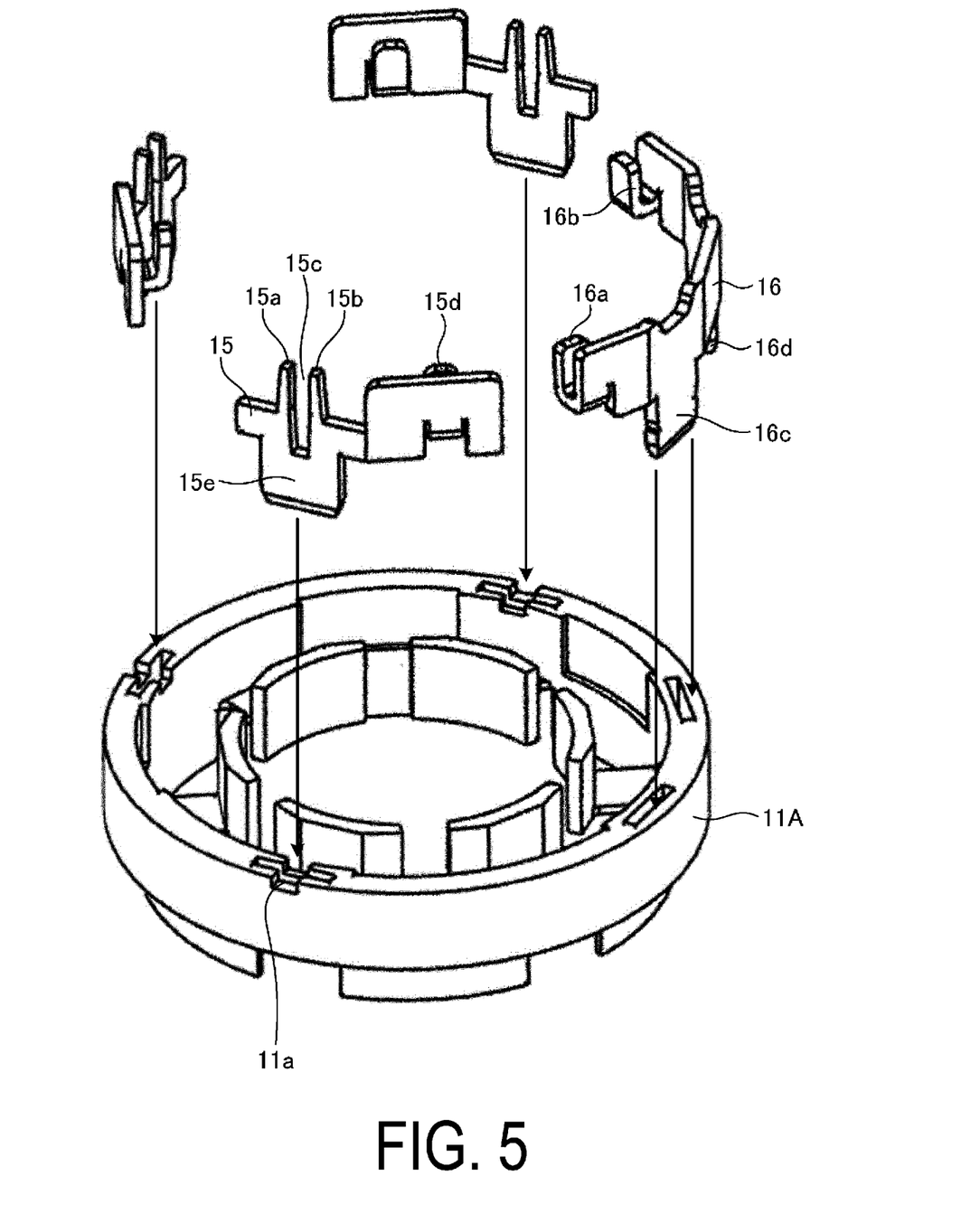
FIG. 5 is an exploded view illustrating details of an insulator, the connection terminal, and a coupling terminal.

FIG. 5 is an exploded view illustrating details of the insulator 11A, the connection terminal 15, and the coupling terminal 16, and is an exploded view of the second member obtained by integrally assembling the insulator 11A, the connection terminal 15, and the coupling terminal 16 in FIG. 3.

In FIG. 5, a plurality of (five in the illustrated example) hole portions 11a are formed in an end surface of the insulator 11A at a side not in contact with the stator core 10. Furthermore, each of the plurality of (three in the illustrated example) connection terminals 15 includes protrusion parts 15a and 15b forming a recess part 15c, a connection portion 15d subjected to fusing or entwining for connection, and a base portion 15e inserted into the insulator 11A. The protrusion part 13c of the terminal holder 13 is inserted into the recess part 15c. The protrusion part 15a, 15b is an example of an engagement portion configured to deform.

The coupling terminal 16 includes connection portions 16a and 16b subjected to fusing or entwining for connection, and base portions 16c and 16d inserted into the insulator 11A. The base portion 15e of the connection terminal 15 and the base portions 16c and 16d of the coupling terminal 16 are inserted into the hole portions 11a of the insulator 11A to form the second member as illustrated at the lower side in FIG. 3.

Figure 6:
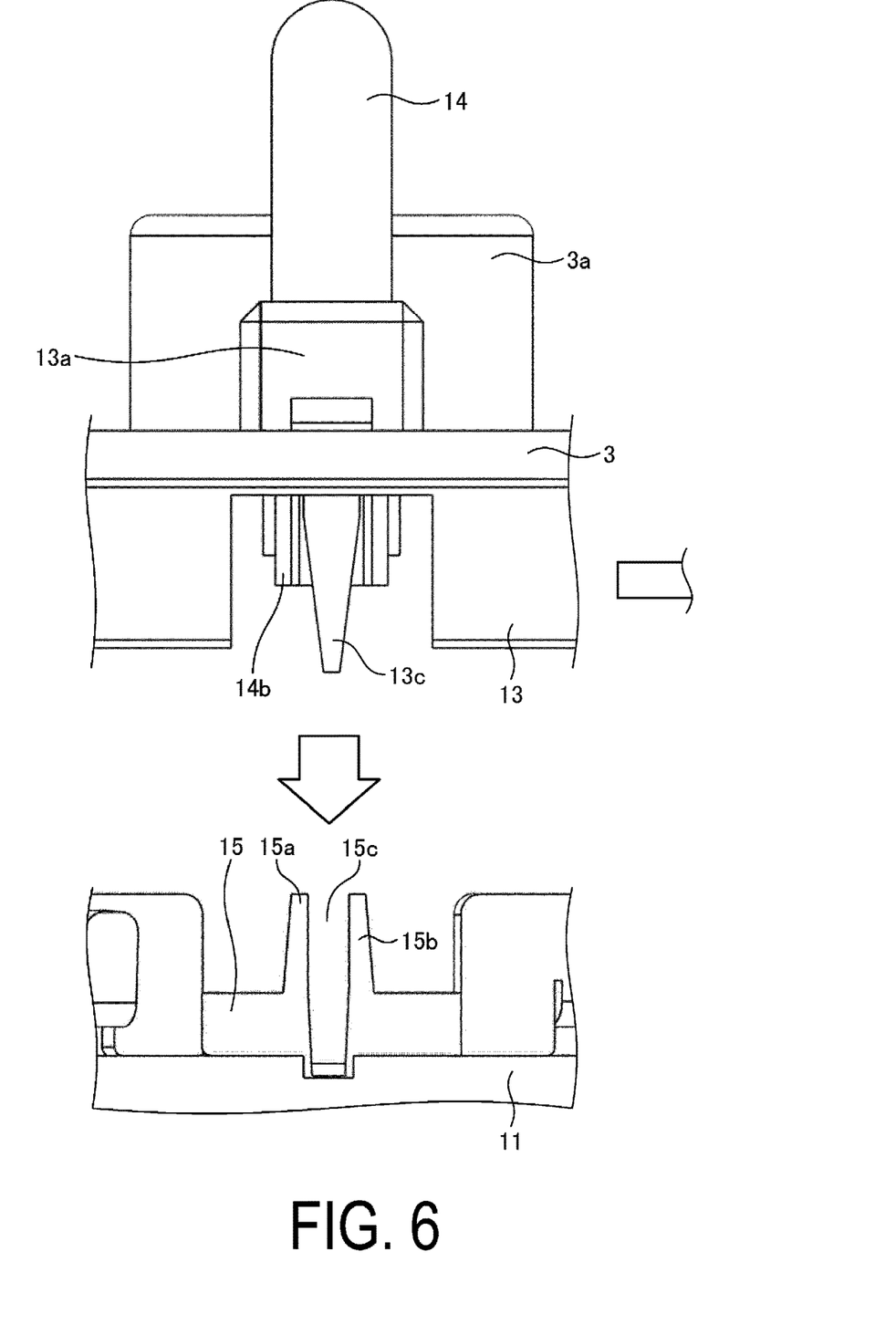
FIG. 6 is a diagram (1) illustrating a state of engagement between the external terminal and the connection terminal during assembly.
Figure 7:
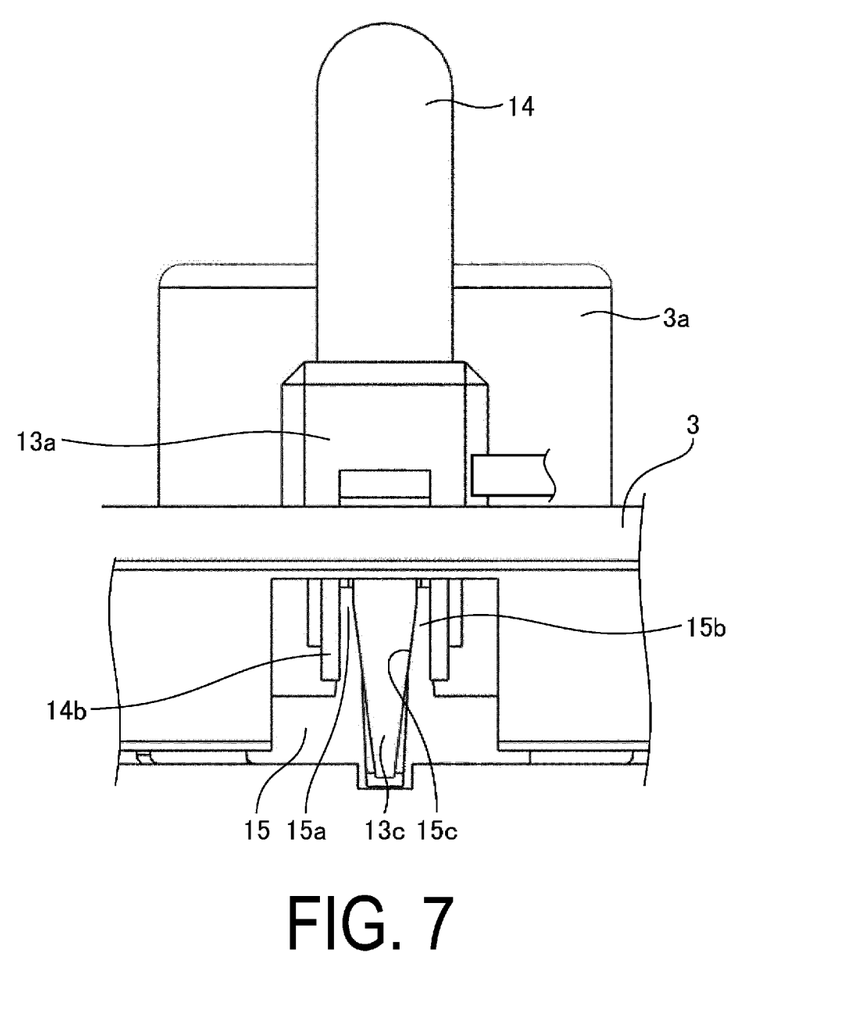
FIG. 7 is a diagram (2) illustrating a state of engagement between the external terminal and the connection terminal during assembly.

FIGS. 6 and 7 are diagrams illustrating a state of engagement between the external terminal 14 and the connection terminal 15 during assembly. FIG. 6 illustrates a state where the external terminal 14 at the cap 3 side and the connection terminal 15 at the insulator 11A side are separated from each other and are about to approach. When the cap 3 is brought closer to the insulator 11A, the protrusion part 13c of the terminal holder 13 is inserted into the recess part 15c of the connection terminal 15, and the protrusion parts 15a and 15b of the connection terminal 15 are inserted between the protrusion part 13c of the terminal holder 13 and the engaged portion 14b of the external terminal 14. In the process of inserting the protrusion portion 13c of the terminal holder 13, the function of positioning is exhibited, and the external terminal 14 and the connection terminal 15 are accurately positioned and engage with each other.

FIG. 7 illustrates a state where engagement between the external terminal 14 and the connection terminal 15 is completed. Since the recess part 15c between the protrusion parts 15a and 15b of the connection terminal 15 is expanded outward by the protrusion part 13c of the terminal holder 13 (the recess part 15c opens outward) and is pressed against the engaged portion 14b of the external terminal 14, electrical connection between the external terminal 14 and the connection terminal 15 is reliably performed.

Embodiments of the present invention have been described above, but the present invention is not limited to the embodiments described above, and various modifications are possible without departing from the spirit of the present invention.

As described above, a motor according to an embodiment includes a cap, and a housing provided with the cap, wherein the cap is provided with a first terminal, the housing is provided with a second terminal, and the first terminal and the second terminal engage with each other to form a terminal portion. With this configuration, a degree of freedom in design of a motor terminal can be increased.

Note that a motor terminal is generally formed of a material such as sheet metal having a predetermined thickness. Thus, for example, when a motor terminal having a thin thickness at an outer side is requested and a thin sheet metal or the like is used, an inner side also becomes thin, and thickness needed for fusing or the like may not be able to be ensured. Further, in order to change thickness and shape at the outer side without changing thickness at the inner side, processing by surface striking or the like is necessary, which leads to an increase in cost and potentially a decrease in dimensional accuracy or the like.

In the motor according to the embodiment, since the first terminal and the second terminal are separate components, materials such as sheet metals having the same thickness do not need to be used. The first terminal can satisfy a request from a delivery destination or the like, and the second terminal can be made suitable for fusion, entwining, or the like, and thus a degree of freedom in design is increased.

Further, occurrence of a defect due to the thickness of the second terminal being unsuitable for fusion or entwining for connection can be suppressed, and productivity can also be improved.

Further, while a terminal satisfying a request from a delivery destination or the like can be quickly and easily prepared as the first terminal, time and effort for processing such as surface striking are reduced, and no decrease in dimensional accuracy occurs.

A nozzle (opening for discharging a lead wire) of a winding device does not interfere with the first terminal during winding of a coil, and operability of winding is improved.

Further, the first terminal is connected to an outside of the motor, and a lead wire forming a coil is welded to or entwined with and connected to the second terminal. In this way, the first terminal can be dedicated to connection to the outside, and the second terminal can be dedicated to connection with the coil.

The motor further includes a first member obtained by integrally assembling the first terminal and the cap, and a second member obtained by integrally assembling the housing and the second terminal, wherein the first member and the second member are configured to be separated. With this configuration, engagement between the first terminal and the second terminal can be performed in a process of combining the first member and the second member.

Further, the second terminal includes an engagement portion configured to deform, the first terminal includes an engaged portion, and the engagement portion and the engaged portion engage with each other. With this configuration, engagement between the first member and the second member can be ensured by deformation of the second terminal.

Further, the cap includes a protrusion portion, and the engagement portion of the second terminal is housed inside the engaged portion of the first terminal, and includes a protrusion portion including a recess portion at a center. With this configuration, the protrusion portion of the cap and the protrusion portion of the engagement portion can come into contact with each other, and the function of positioning can be achieved.

Further, the protrusion portion of the cap is inserted into the recess portion of the engagement portion, and thus the recess portion of the engagement portion opens outward and the protrusion portion of the engagement portion and the engaged portion engage with each other. With this configuration, engagement between the first member and the second member can be ensured.

Moreover, the present invention is not limited to the embodiment described above. A configuration obtained by appropriately combining the above-mentioned constituent elements is also included in the present invention. Further effects and modifications can be easily derived by a person skilled in the art. Thus, a wide range of aspects of the present invention is not limited to the embodiment described above, and may be modified variously.

REFERENCE SIGNS LIST

1 Motor
2 Housing
3 Cap
4 Shaft
5, 6 Bearing
7 Spring
8 Rotor yoke
9 Magnet
10 Stator core
11A, 11B Insulator
12 Stator coil
13 Terminal holder
13a Boss portion
13b Hole portion
13c Protrusion part
14 External terminal
14a Plug blade portion
14b Engaged portion
15 Connection terminal
15c Recess part
16 Coupling terminal

The invention claimed is:

1. A motor comprising:
a cap; and
a housing provided with the cap, wherein
the cap is provided with a first terminal,
the housing is provided with a second terminal,
the first terminal and the second terminal engage with each other to form a terminal portion,
the second terminal includes an engagement portion configured to deform,
the first terminal includes an engaged portion,
the cap includes a protrusion part arranged inside the engaged portion and protrudes towards the housing,
the engagement portion is arranged between the engaged portion and the protrusion part,
the protrusion part is arranged inside a recessed part of the engaged engagement portion, and
the engagement portion and the engaged portion engage with each other.

2. The motor according to claim 1, wherein
the first terminal is connected to an outside of the motor, and
a lead wire forming a coil is welded to or entwined with and connected to the second terminal.

3. The motor according to claim 1, further comprising:
a first member obtained by integrally assembling the first terminal and the cap; and
a second member obtained by integrally assembling the housing and the second terminal, wherein
the first member and the second member are configured to be separated.

4. The motor according to claim 1, wherein
the cap includes a terminal holder supporting the first terminal,
the terminal holder includes the protrusion part arranged inside the engaged portion.

* * * * *